(12) United States Patent
Uhl et al.

(10) Patent No.: US 6,194,999 B1
(45) Date of Patent: Feb. 27, 2001

(54) DEVICE FITTED ON VEHICLES FOR MONITORING TYRE PRESSURE

(76) Inventors: Günter Uhl, Hauptstrasse 88, D-74921 Helmstadt-Bargen; Norbert Normann, Panoramastrasse 12, D-75223 Niefern-Öschelbornn; Gunter Lothar Schulze, Lutherstrasse 3, D-75228 Ispringen; Ralph Kessler, Lessingstrasse 12, D-75228 Pfinztal, all of (DE); Michael Schröttle, Im Gree 75, CH-8566 Ellighausen (CH)

( * ) Notice: Subject to any disclaimer, the term of this patent is extended or adjusted under 35 U.S.C. 154(b) by 0 days.

(21) Appl. No.: 08/952,690
(22) PCT Filed: May 26, 1996
(86) PCT No.: PCT/EP96/02264
  § 371 Date: Jun. 8, 1998
  § 102(e) Date: Jun. 8, 1998
(87) PCT Pub. No.: WO96/37374
  PCT Pub. Date: Nov. 28, 1996

(30) Foreign Application Priority Data

May 26, 1995 (DE) .............................................. 195 18 806

(51) Int. Cl.[7] .................................................... B60C 23/00
(52) U.S. Cl. .......................... 340/447; 340/448; 73/146.5; 73/146.8; 200/61.22
(58) Field of Search ..................................... 340/442, 445, 340/447, 448; 73/146.2, 146.5, 146.8; 200/61.22, 61.25

(56) References Cited

U.S. PATENT DOCUMENTS

| | | | | |
|---|---|---|---|---|
| 4,947,151 | * | 8/1990 | Rosenberger | 340/447 |
| 5,140,851 | * | 8/1992 | Hettich et al. | 340/448 |
| 5,541,574 | * | 7/1996 | Lowe et al. | 340/447 |
| 5,790,016 | * | 8/1998 | Konchin et al. | 340/445 |
| 5,808,190 | * | 9/1998 | Ernst | 340/445 |
| 5,825,286 | * | 10/1998 | Coulthard | 340/445 |

* cited by examiner

Primary Examiner—Daniel J. Wu
(74) Attorney, Agent, or Firm—Dvorak & Orum

(57) ABSTRACT

The proposed device is fitted on vehicles equipped with pneumatic tires and is used for monitoring tire pressure. The device comprises: a pressure measurement sensor on each of the wheels (2) being monitored; a transmitter mounted next to each pressure measurement sensor which emits signals carrying the pressure data obtained from the pressure measurement sensor, and a receiver for those signals fitted on the vehicle chassis. An antenna (5a, 6a, 7a, 8a) is arranged next to each wheel (2) as the receiver. The antennae are connected to a common receiving and monitoring circuit (15, 17).

9 Claims, 3 Drawing Sheets

DEVICE FITTED ON VEHICLES FOR MONITORING TYRE PRESSURE

BACKGROUND OF THE INVENTION

1. Field of the Invention

Figure 1:
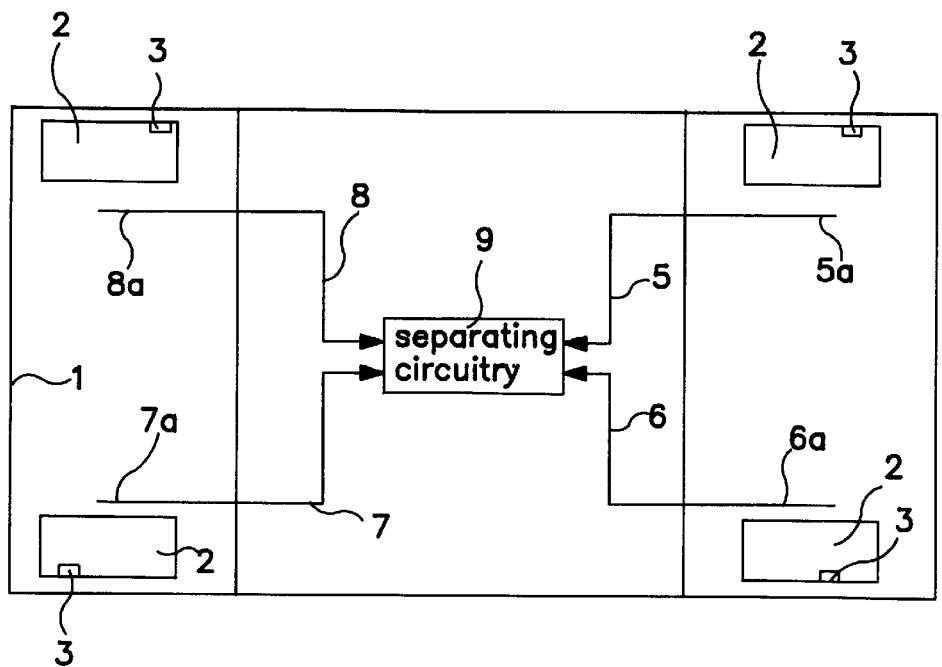

The invention deals with a device fitted on vehicles for monitoring the air pressure in the vehicle's tires.

2. Discussion of the Prior Art

In known devices for monitoring the air pressure in the tires of a vehicle, pressure sensors are arranged in the wheels and each pressure sensor is connected with a transmitter. Here, an antenna is positioned in the vicinity of each wheel and the antennas are connected with a common receiving and evaluating circuitry. The transmitters provided in the wheels are not synchronized with each other. Therefore, it is possible that the signal strings coming from the various wheels overlap at the input side of the receiving and evaluating circuitry, thereby preventing unambiguous evaluation. This difficulty has previously been resolved where the disclosed device for monitoring the tire pressure is provided with a pressure sensor and a transmitter, which are integrated in the valve cap of each wheel in the form of an electronic assembly. In order to obtain the measured tire pressure by remote scanning, a preferably portable remote control unit equipped with a transmitter/receiver combination is provided. This unit is deployed in the vicinity of the selected tire to activate and scan the electronic assembly. In this case the tire pressure can be monitored only from time to time when the vehicle is standing still, but not when it is moving. However, for the purpose of scanning the electronic assembly provided in the valve cap. It is known to provide transmitting and receiving devices which are not contained in a portable remote control unit but are fixed to the chassis of the vehicle in the vicinity of the wheel, as well as providing display devices on the dashboard. This is an expensive solution, since the signals which are emitted by the transmitter located in a particular wheel and which contain the air pressure determined by the pressure sensor, are each transmitted wirelessly to a separate transmitting and receiving device assigned to each wheel.

A similar device is disclosed has been disclosed where the pressure sensor and the transmitter are not located in the valve cap but at the valve spud.

It is also known to provide an assembly consisting of a pressure sensor and a transmitter at the valve spud of an air tire, whereby to each transmitter in a particular tire valve is assigned a tuned-in receiver in the vicinity of the vehicle's wheel.

SUMMARY OF THE INVENTION

The object of the invention on hand is to show that even a simple and easy to install device for monitoring tire pressure while the vehicle is moving as well as while standing still, is capable of evaluating signals unambiguously.

The rectifier provided according to the invention rectifies the branched-off signal. If the field strength of the signal is sufficiently strong, the rectified signal component is able to set an input of the microcomputer on HIGH which enables the microcomputer to assign the transmitted signal to a particular wheel. If signals transmitted from several wheels are overlapping or are transmitted simultaneously, several inputs are set on HIGH, in which case the signals are not evaluated, in order to avoid erroneous evaluation.

In the vicinity of each wheel, only an antenna is provided, and all antennas are connected with a common electronic receiving and evaluating circuitry. An antenna cable is required to connect the antenna in the wheel housing with the receiving circuitry which may be located anywhere in a central location in the vehicle chassis, for example, in the dashboard area. The antenna cables need not be installed individually, which would be an expensive undertaking, but instead can be combined with other cables which need to be installed in the vicinity of the wheel anyway, to form a cable harness which can be prefabricated.

It is especially advantageous if, instead of installing a dedicated antenna cable, an electric cable is used as an antenna which needs to be installed anyway and belongs to another monitoring device assigned to the same wheel, in particular, a device monitoring brake lining wear of the wheel in question, or an ABS system, or a type of control device which prevents driven wheels from slipping. This would minimize circuitry cost, susceptibility to breakdown, and reduce cabling cost, because of the multiple use of an electric cable installed to each wheel area. This latter point is particularly important, because in the past few years the number of vehicle functions monitored, controlled and operated has steadily increased making it more and more difficult to accommodate the ever increasing cable harness thickness in the chassis cavities. The multiple use of an electric line allows each wheel to have its own antenna without increasing the cabling cost for signal transmission from the transmitter to the receiving and evaluating circuitry.

Naturally the cable must be suitable as an antenna for the intended frequency range. The frequencies needed for transmission are in the range of several hundred MHz, especially 433 MHz. Since the frequencies customarily used for ABS and ASR applications are not more than a few kHz and the brake liner wear display is performed in the low frequency range or with direct current, the high frequency signals used for monitoring tire pressures and the low frequency signals used for other monitoring functions can be easily combined in and again separated from one common line.

A co-axial cable is preferably utilized as electric line. In the vicinity of each wheel this cable is stripped of the outer conductor over a portion of its length, in particular over the length corresponding to one quarter of the wave length of the signal transmitting the tire pressure; for a frequency of 433 MHZ, this length is 17 cm.

There is another possibility which is modifying the sensors utilized in the ABS system, in the in ASR control, or in the brake liner wear display, so that they become suitable as antennas for tire pressure monitoring. In this case the cables used for further processing are also made for dual use by utilizing them for tire pressure monitoring as well.

Cables other than those used in a monitoring function can also be used as antenna cables, provided they are installed in sufficient proximity to the particular wheel in question, for example, lines used to supply electricity to a light or any other electric device.

DETAILED DESCRIPTION OF THE DRAWINGS

Additional advantages and embodiments of the invention are described in the following exemplary embodiments using the attached drawings.

Figure 4:
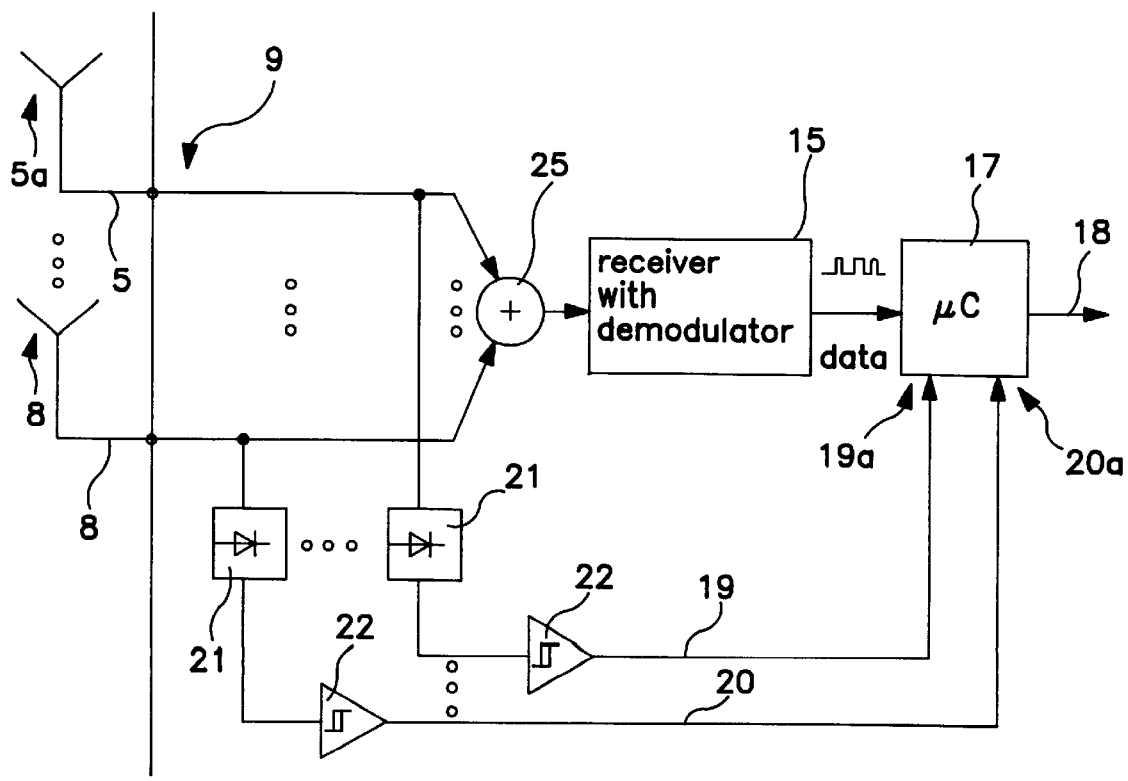
Figure 2:
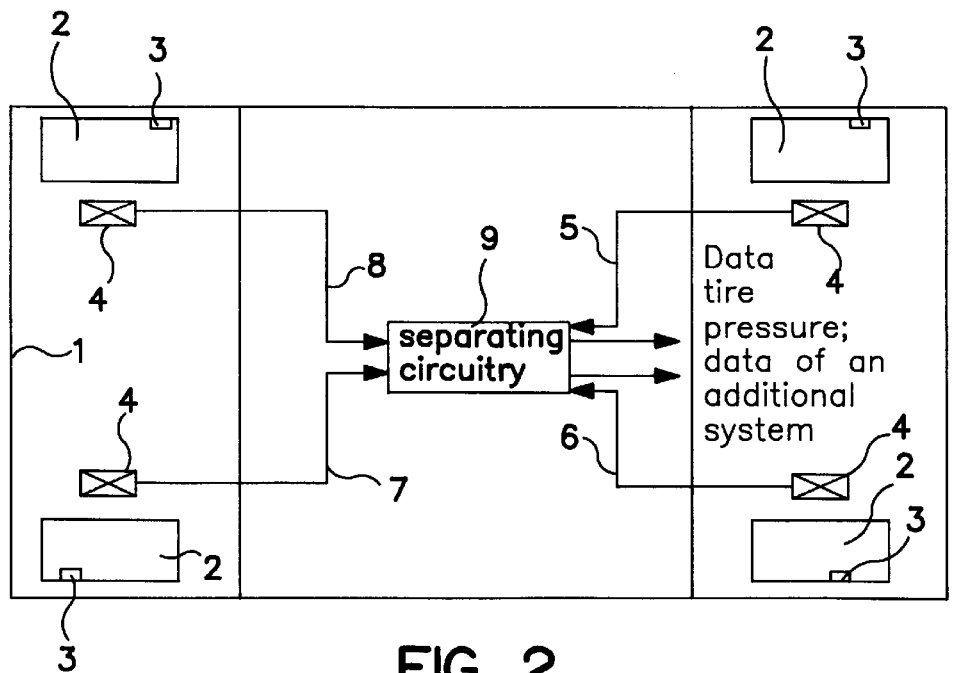
Figure 3:
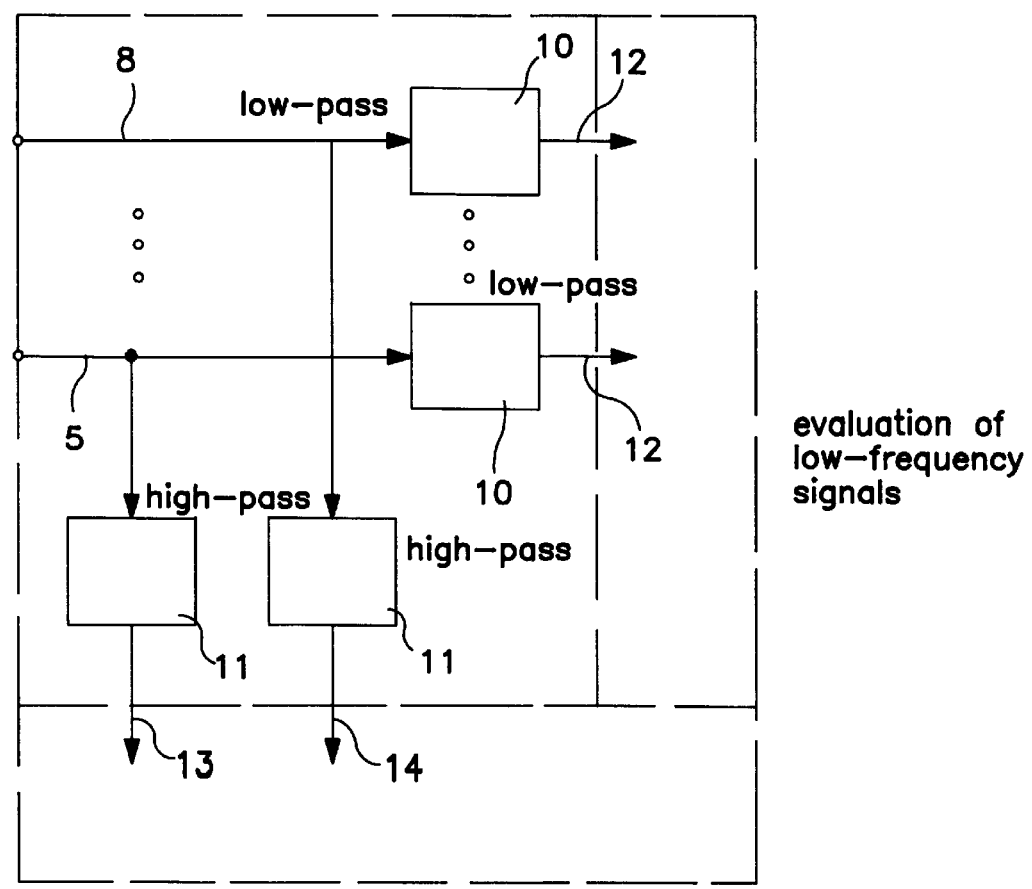
Figure 5:
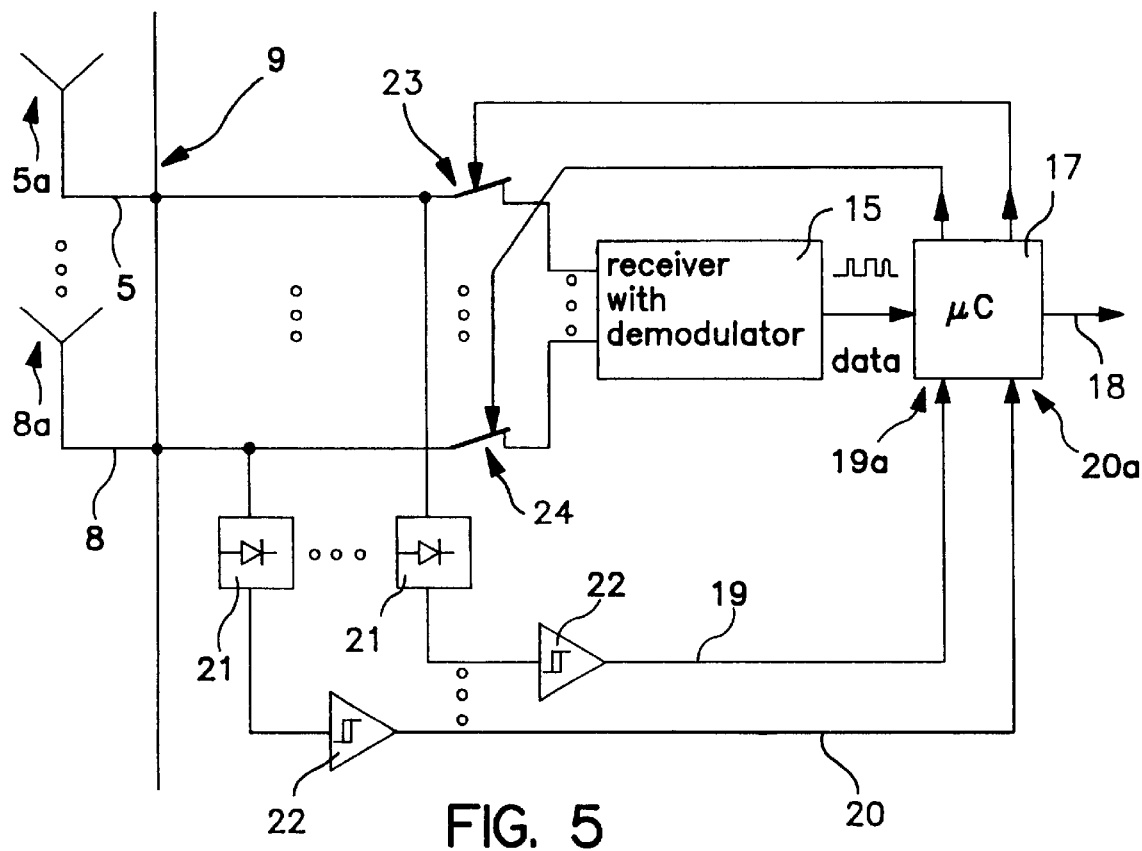

FIG. 1 shows schematically the arrangement of a first device for monitoring tire pressure in a vehicle, FIG. 2 shows schematically the arrangement of a second device for checking the tire pressure in a vehicle, FIG. 3 shows a block diagram of a circuit element designed for separating high-frequency and low-frequency signal components, FIG. 4 shows, in the form of a block diagram, an embodiment of a receiving and evaluating circuitry with only one receiver, and FIG. 5 shows, in the form of a block diagram, an additional embodiment of a receiving and evaluating circuitry with only one receiver.

DETAILED DESCRIPTION OF THE PREFFERRED EMBODIMENT

In the various figures identical or corresponding components are designated with the same reference numbers.

FIG. 1 shows schematically the plan view of the chassis 1 of a vehicle with four wheels 2, each of which is equipped with an arrangement 3 consisting of a pressure sensor and a transmitter. An antenna 5a, 6a, 7a, 8a is assigned to each wheel 2. The antennas are formed by a section of a co-axial cable 5, 6, 7, 8 which is stripped of its outer conductor so that the inner conductor of the co-axial cable in this section 5a, 6a, 7a, 8a is not shielded by the outer conductor, but can receive high-frequency signals. The co-axial cables 5, 6, 7, 8 are connected to a separating circuitry 9 shown in FIG. 3. The length of the sections 5a, 6a, 7a, 8a is conveniently made equal to one quarter of the wave length of the frequency transmitted by the transmitter provided in arrangement 3; for a frequency of 433 MHZ, this length is 17 cm.

The exemplary embodiment shown in FIG. 2 differs from that shown in FIG. 1 in that a sensor 4 located in the vicinity of wheel 2 is assigned to each wheel 2. Sensor 4 could be a sensor monitoring wheel rotation as part of an ABS or ASR system, or a sensor monitoring the wear of the brake pad of a disc brake belonging to wheel 2.

Electric lines 5, 6, 7, and 8 connect sensors 4 to a separating circuitry 9 as illustrated in FIG. 4, for example.

In this second example, lines 5 through 8 are also suited for transmitting high-frequency signals. In particular, they are co-axial cables. Not only do they transmit the ABS-, ASR-, or brake line wear signals generated by sensors 4, but also signals transmitted wirelessly by the transmitters located in arrangements 3. For this purpose, sensors 4 are modified to serve additionally as high-frequency antennas.

The signals transmitted by arrangements 3 and received in the manner illustrated in FIGS. 1 and 2, are filtered in the separating circuitry 9 by low-pass filter 10 and high-pass filter 11 to separate out possible direct current components, and in the example of FIG. 2, low-frequency signals emitted by sensors 4. The low-frequency signals are sent via lines 12 to a known evaluating circuitry which is not part of the invention on hand.

The high-frequency signals are sent via separate lines 13, 14 to a suitable receiving and evaluating circuitry. Suitable circuitries are shown in FIGS. 4 and 5.

In the circuitry shown in FIG. 4, signals containing information on the air pressure in the tire which are transmitted by the transmitter on wheel 2 are received by antennas 5a–8a which are made up of sections of co-axial cables 5 through 8 stripped of their outer conductors, and sent to a common receiver 15 with demodulator by way of the co-axial cables 5 through 8 and the separating circuitry 9 which in FIG. 4 is shown merely as an interface. For signal evaluation the demodulated signals are sent to a microcomputer 17 which, at output 18, delivers signals controlling a display, for example an LCD display or a warning light.

The signals from all antennas 5a–8a are summed up in a summing integrator 25 and input in the single receiver 15 with demodulator which creates a binary signal from the data string received from the wheels 2 which is input into the microcomputer 17 serving as an evaluating circuitry.

As described in the state-of-the-art, arrangements 3, comprising a pressure sensor and a transmitter, send a data string to the receiver 15 only intermittently; this is because arrangements 3 operate only intermittently in order to conserve battery power. It is possible that data strings coming from various wheels 2 overlap each other, since the transmitters provided on the wheels are not synchronized with each other. In order to nonetheless unambiguously monitor tire pressure, the field strength of each signal sent to receiver 15 is evaluated. For this purpose a branch cable 19, 20 is tapped into each of the supply cables 5–8 and is connected directly with the microcomputer, thereby bypassing the receiver 15. A rectifier 21 and a limiting value switch 22 are arranged in series in each of the branch cables 19, 20. The rectifier 21 rectifies the branched-off signal component. Provided the signal field strength is sufficiently strong, the rectified component passes the limiting value switch 22 and reaches an input 19a or 20a of the microcomputer, respectively, which is then set on HIGH. In this manner the signal obtained from receiver 15 can be assigned by the microcomputer 17 to a particular wheel 2. If data received from a multitude of wheels overlap or are received simultaneously, several corresponding inputs 19a, 20a of the microcomputer are set on HIGH.

In this case the data obtained by the microprocessor 17 from the receiver 15 is not evaluated.

The embodiment shown in FIG. 5 differs from that shown in FIG. 4 in that for each wheel 2 a switch 23, 24, controllable by the microprocessor 17, is installed before the receiver 15. The switches 23, 24 replace the summing integrator 25 shown in FIG. 4. The signals coming from the antennas 5a–8a are sent through the switches 23, 24 to the receiver 15 with demodulator. The field strength is evaluated in the same way as shown in the exemplary embodiment according to FIG. 4. Only if a signal, branched off from one of the lines 5–8 and rectified, has set one of the inputs 19a, 20a of the microcomputer on HIGH, the switch 23, 24 in the accompanying line 5–8 is closed and the signal coming from the antenna 5a–8a is sent through to the receiver 15. Another incoming and timewise overlapping signal from another antenna is not sent through to the receiver 15 by the microprocessor 17 and thus cannot disturb the evaluation of the signal that arrived before. When data strings coming from wheels 2 overlap, the first to arrive will be evaluated. However, it is also possible to work on the basis of a priority list. This means that if incoming data strings overlap and the data string coming in second originates from a wheel with higher priority, then the evaluation of the first data string is interrupted and the evaluation is switched to the second data string. It is also possible that the microcomputer cyclically scans the antennas 5a–8a assigned to the wheels, in which case the field strength evaluation is not required.

We claim:

1. Device on vehicles with wheels having air tires, for monitoring the air pressure in the tires using a pressure sensor on each of the tires (2) to be monitored, with each pressure sensor accompanied by a transmitter which sends out signals containing the sensed air pressure, and with antennas for receiving the signals which are fastened to the chassis of the vehicle, whereby merely one antenna (4; 5a–8a) is arranged in the vicinity of each wheel (2) and the antennas (4; 5a–8a) are connected with a common electronic receiving and evaluating circuitry (15, 17), characterized in that from each of the electric lines (5, 6, 7, 8) connecting the antennas with the receiving circuitry (15), a branch line (19, 20) with a rectifier (21) branches off, and the branch line connects with a microcomputer serving as an evaluating circuitry (17) which is controlled by the rectified signals in such a way that every time when a signal is received from the transmitter (3) on the wheel (2) by way of one of the antennas, the microcomputer (17) evaluates only that signal which is sent by the corresponding line (5–8) to the receiving circuitry (15).

2. Device according to claim 1, characterized in that the antenna (4; 5a–8a) utilizes an electric line (5–8) which belongs to another monitoring device assigned to the same wheel (2).

3. Device according to claim 1, characterized in that a sensor (4) belonging to another monitoring device assigned to the same wheel (2) is designed to serve as an antenna also.

4. Device according to claim 1, characterized in that an electric line which is connected to another user installed in the vicinity of a particular wheel (2), for example a rear light, is utilized as an antenna.

5. Device according to claim 2, characterized in that the other monitoring device (4) monitors the brake liner wear.

6. Device according to claim 2, characterized in that the other monitoring device (4) monitors the wheels (2) with regard to blocking (ABS system) and/or slipping (ASR system).

7. Device according to claim 1, characterized in that the electric line (5, 6, 7, 8) is a co-axial cable which is stripped of its outer conductor over a portion of its length in the vicinity of the wheel (2).

8. Device according to claim 1, characterized in that in each of the branch lines (19, 20) a limiting value switch (22) is installed which permits the rectified signal to pass through to the evaluating circuitry only if this signal exceeds a certain limiting value.

9. Device according to claim 8, characterized in that in each of the lines (5–8) connecting the antennas with the receiving circuitry an interrupting switch (22, 23) is installed which is controlled by the microcomputer (17).

* * * * *